United States Patent [19]

Watanabe et al.

[11] 3,905,568

[45] Sept. 16, 1975

[54] MOVABLE GIRDER TYPE HIGH SPEED TURNOUT DEVICE

[75] Inventors: Yusaku Watanabe; Masayuki Ikemori; Tuneharu Kitakata, all of Tokyo, Japan

[73] Assignee: Japanese National Railways, Tokyo, Japan

[22] Filed: Apr. 29, 1974

[21] Appl. No.: 465,365

[30] Foreign Application Priority Data
Apr. 28, 1973   Japan................................ 48-47367

[52] U.S. Cl................................. 246/430; 104/130
[51] Int. Cl.².......................................... E01B 7/00
[58] Field of Search.................... 104/130, 131, 132; 246/433, 430, 415, 392

[56] References Cited
UNITED STATES PATENTS

| | | | |
|---|---|---|---|
| 1,050,421 | 1/1913 | Bilyeu | 246/430 |
| 1,055,465 | 3/1913 | Jackson | 246/430 |
| 1,156,183 | 10/1915 | Saint | 246/430 |
| 3,046,909 | 7/1962 | Gorjanc | 246/430 |
| 3,126,839 | 3/1964 | Hampton et al. | 246/430 |
| 3,193,675 | 7/1965 | Parkes et al. | 246/430 |
| 3,745,336 | 7/1973 | Dohse | 246/430 |

Primary Examiner—M. Henson Wood, Jr.
Assistant Examiner—Richard A. Bertsch
Attorney, Agent, or Firm—Armstrong, Nikaido & Wegner

[57] ABSTRACT

A movable girder type of high speed turnout device is provided for switching a track between main line and branch line rails. The device comprises girders which are movable perpendicular to the longitudinal direction of the rails and a plurality of rails laid on the girders, forming portions of the main line and branch line. Movable rails are provided for connecting the ends of the rails laid on the girders with the opposed ends of the main line rails and branch line rails laid adjoining the girders. The lateral displacement of the girders forms a specified gap between the ends of the main line rails or the branch line rails on the girders and the corresponding ends of the fixed main line rails or branch line rails, and the longitudinal displacement of the movable rails closes the specified gaps, thereby forming a main line route or branch line route of the main line rails or branch line rails laid on the girders facing the corresponding ends of the fixed main line rails or branch line rails, whereby a main line route or branch line route can be formed. Locking devices are provided to assure a tight connection of the movable rails and fixed rails.

9 Claims, 26 Drawing Figures

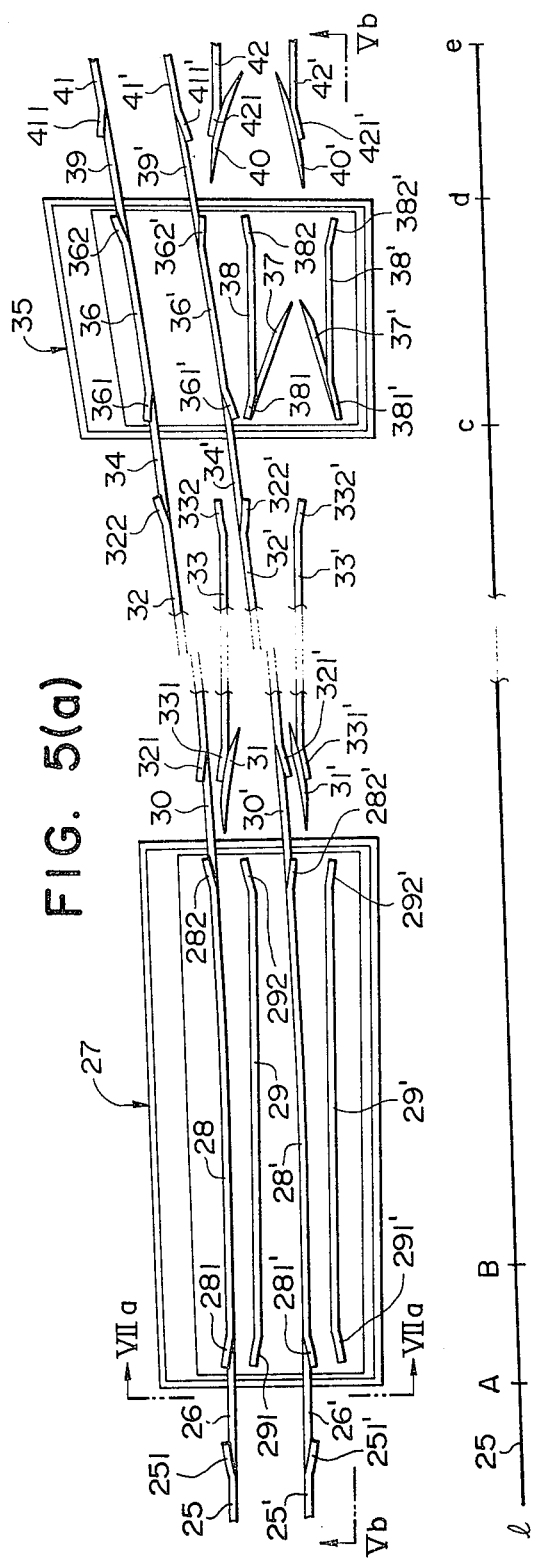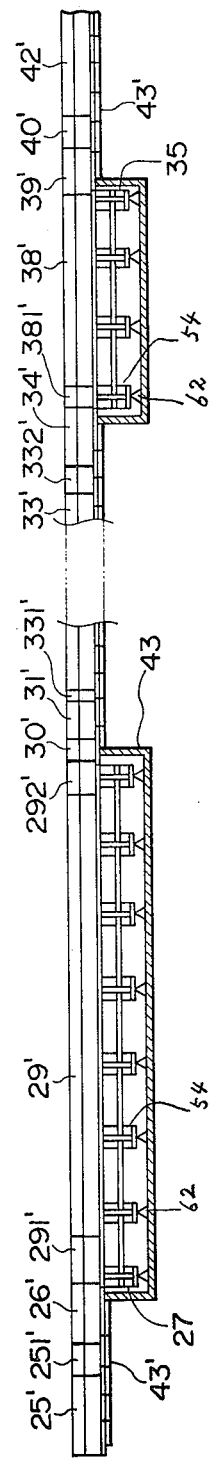

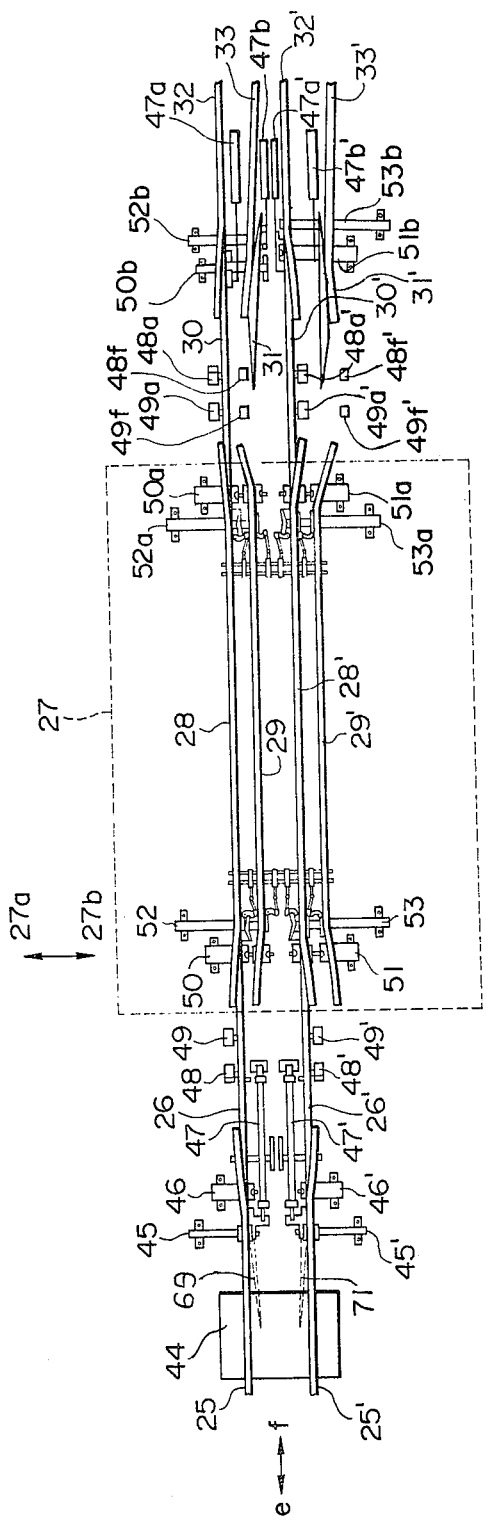

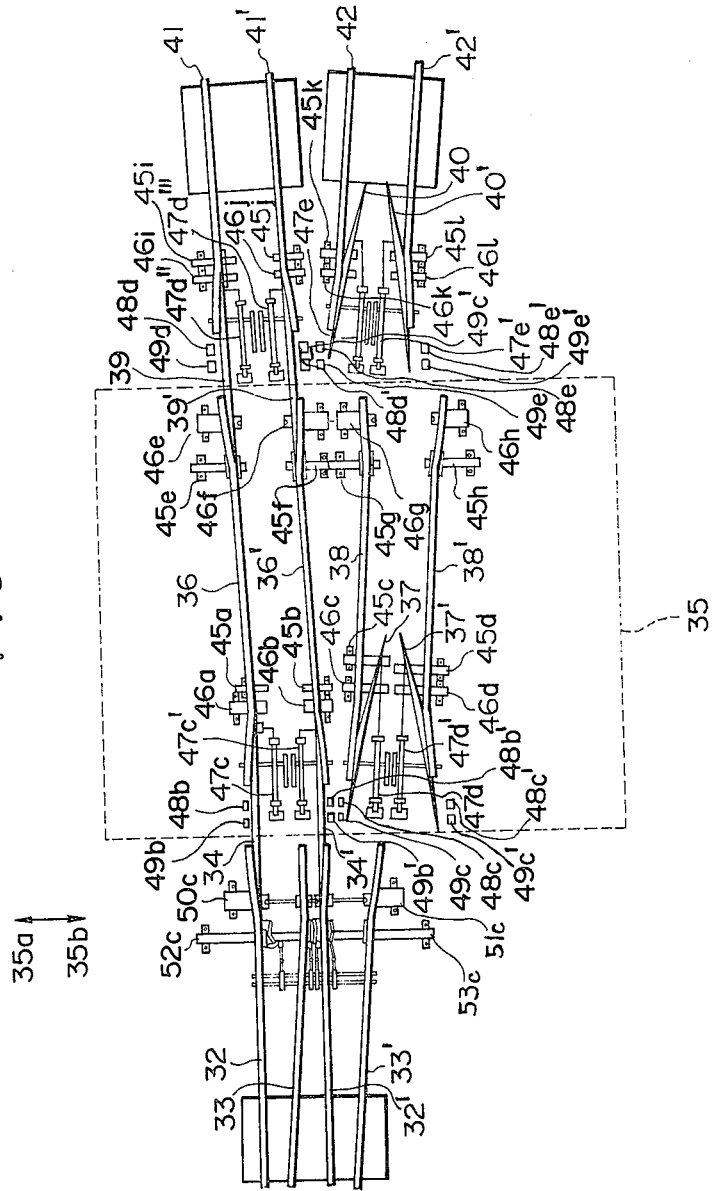

FIG. 8(b)
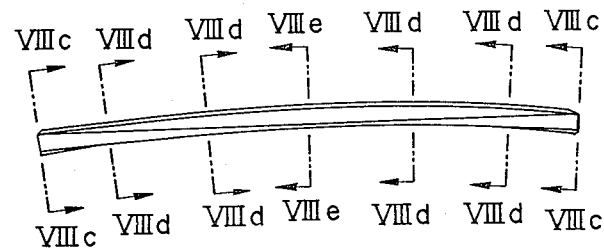
FIG. 8(c)    FIG. 8(d)    FIG. 8(e)
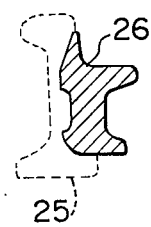 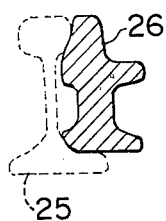 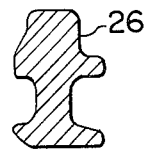
FIG. 8(f)
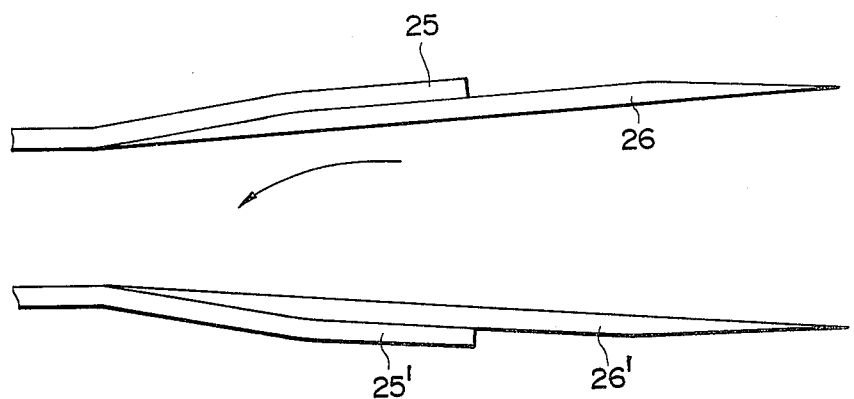

MOVABLE GIRDER TYPE HIGH SPEED TURNOUT DEVICE

BACKGROUND OF THE INVENTION

In one type of the conventional turnout as illustrated in FIGS. 1 a and b, the route to the main line or the branch line is formed by right or left displacement of a pair of tongue rails across the track. In this type, however, a gap unavoidably occurs in the crossings, and the vehicle passing over it receives a shock and therefore the crossings-passing speed of the vehicle has to be substantially decreased. In an effort to avoid such an inconvenience a movable-nose turnout device as illustrated in FIG. 2 a–c has been developed. In this new type of turnout device movable nose- rails are provided which can move along the two nose-like side surfaces of the crossings. The rails are made flexible near the tip and the forward portions of the rails beyond the flexible portion can be swung right or left with a certain rail point close to the flexible portion in the direction of crossings as the center, thereby forming the route to the branch line or to the main line. In this turnout device the route is formed with one side of said forward portion of the rail tightly fitted to the sides of the opposed wing rail and the adjoining main line or branch line rails. Thus there is no gap present in the crossings and the primary disadvantage of a turnout device as illustrated in FIG. 1 a is eliminated. This is certainly an improvement, but still the following difficulty remains to be overcome, before the existing turnout device can permit vehicles to pass at a high speed of over 160 Km/h.

To enable high speed passage of vehicles over the turnout with safety, 1. the branch line rail has to be canted or the radius of curvature at turnout has to be enlarged, 2. the branch line has to connect via an easement curve to the straight main line rail and 3. the crossings of the branch line has to be designed with no gap.

Canting of the branch line rail is impossible as is described later, if the turnout device is of the existing design. Meanwhile, an enlarged radius of curvature at the turnout will make the turnout device extremely long, resulting in increased length of tongue rail and nose rails at crossings, thus these ideas are technically hard to realize, so long as the present design of turnout is retained. As described later, it is also practically impossible to insert a rail for easement of the curve in the branch line rails in the structure of turnout device in the prior art.

In view of these disadvantages of the conventional turnout devices, the object of the present invention is to provide a turnout device for passage of vehicle over the turnout at a speed exceeding 160 Km/h, wherein a girder, which can be displaced to the right or left of the longitudinal direction of the rail, is installed at the points and crossings. On said girder, are laid the rails which constitute parts of the main line and the branch line routes, and displacement of said girder sets the route to the main line or to the branch line, thereby making it possible to give necessary cant to the branch line track, to insert a rail for easement of curve in the branch line rails, and to realize a more desirable non-gap structure of the turnout device free from a guard rail and wing rail of the conventional crossings, with the result that vehicle can pass the turnout at a speed exceeding 160 Km/h.

Other objects, features and advantages of the present invention will become more readily apparant from the following detailed description made in conjunction with the attached drawings.

SUMMARY OF THE INVENTION

In the present invention at the points and crossings of a turnout device a girder is installed which can move to the right or left of the longitudinal direction of rail. To said girder are fastened the rails constituting respectively parts of the main line and the branch line. The end faces of said rails parts of the main line and the branch line, laid on said girder, are separated by a specified gap from the opposing end faces of the corresponding fixed rails on a concrete slab in the longitudinal direction of the rails. Between the end part of the rail laid on the girder and corresponding end part of said fixed rails are installed movable rails which can be displaced in the longitudinal direction of the rail. Right or left displacement of said girder to the longitudinal direction of the rail to first or second positions brings into opposition the end faces of the main line rails or the branch line rails on said girder and the corresponding end faces of the fixed main line rails or the fixed branch line rails. When in this arrangement of opposition between the end faces of the rails on the girder and the fixed rails on the concrete slab, said movable rails are displaced in the longitudinal direction of the rail to third or fourth positions and the route to the main line or the branch line can be formed or broken. At both ends of said rails on the girder and at the opposing ends of said fixed rails there are provided fastening and locking devices to assure tight connection to said movable rails. A desired cant is preferably given to the branch line route, and an easement curve is inserted at specified portions of the branch line rails. It is also desirable that the ends of the main line rails and the branch line rails on the girders and the opposed ends of the corresponding fixed rails be outward-divergently curved with a specified curvature, so that said movable rails may be displaced along these curves.

BRIEF DESCRIPTION OF THE DRAWINGS

FIG. 1 b is a partial enlarged plan view of the crossings of the turnout illustrated in FIG. 1 a.

FIG. 2 b is a partial enlarged plan view of the crossings of the turnout illustrated in FIG. 2 a.

FIG. 2 c is a sectional view of the flexible portion of rail in FIG. 2 a.

FIG. 5 a is a plan view of the embodiment of the present invention.

FIG. 5 b is a sectional view along 5b — 5b of FIG. 5 a.

FIG. 6 a is a plan view illustrating details of the points in FIG. 5 a.

FIG. 6 b is a plan view illustrating details of the crossings in FIG. 5 a.

FIG. 8 b is a plane view of the movable rails.

FIG. 8 c – e are section views of the movable rails.

FIG. 8 f is a plan view illustrating the movable rail connecting or disconnecting the rails forming the main line route or branch line.

FIG. 9 b is a front elevation illustrating movement means for the movable rail as rotatably fitted.

FIG. 10 b is a side view illustrating a stopper of the movable rails as fitted to the specified side face of the corresponding rail.

FIG. 11 b is a partial section view of the locking device of the present invention.

FIG. 11 c is a plan view illustrating another locking device of the present invention.

FIG. 11 d is a front elevation view of FIG. 11 c.

DESCRIPTION OF THE PREFERRED EMBODIMENT

Figure 1A:
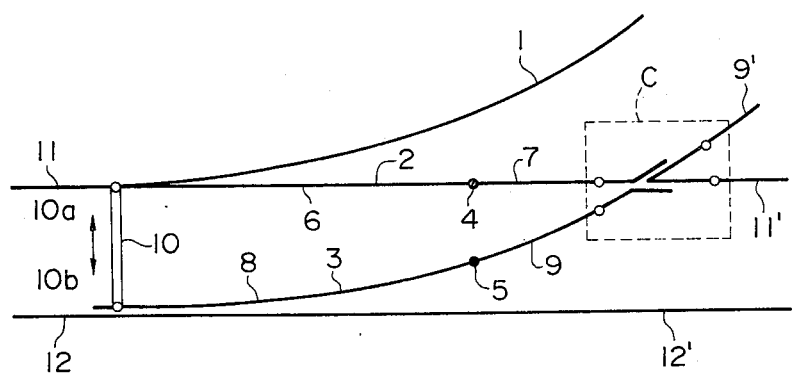
FIG. 1 a is a plan view of the turnout of the prior art.
Figure 1B:
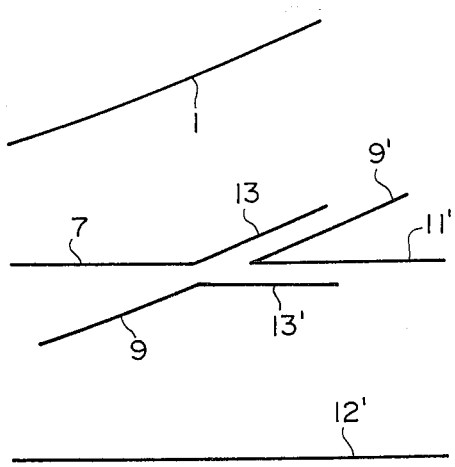

First referring to FIGS. 1 a –2c the railway turnout device in the prior art is to be described.

In FIG. 1 a, 1 and 3 are the rails constituting a branch line; and 2, 11 and 12, 12' are the rails constituting the main line. The tips of the main line rails 2 and the branch line rails 3 are connected by means of the linkage 10. Meanwhile, at a specified position of said main line rail 2 and said branch line rails 3 there are provided the jointed heels 4 and 5. The forward portions 6 and 8 respectively of the main line 2 and the branch line 3 in front of said heels 4 and 5 can be swung with said heels 4 and 5 as fulcrum, right or left with respect to the longitudinal direction of rails. The main line rail portion 7 and the branch line portion 9 respectively to the right of said heels 4 and 5 in FIG. 1 a are immovable. Therefore, when said linkage 10 is shifted in the arrow 10a – 10b direction by a known device, the route to the branch line or to the main line can be set at the points. In the state of FIG. 1 a, the movable tip of the branch line rails 3 is separated by a sepcified gap from the opposite side of the main line rails 12, while the tip of the movable portion 6 of the main rail 2 connects to the main line rails adjacent to it on the left side in FIG. 1 a, thus the route to the main line being formed by the rails 11, 2 and 12, 12'. When in this state the linkage 10 is shifted by a specified distance in the direction of arrow 10b, the tip of the movable portion 6 in the main line rails 2 comes to be separated by a specified gap from the main line 11, while the side surface of the tip of the movable portion 8 in the branch line rail 3 comes to close-fit the opposite side surface of the main line rail 12, thereby the route to the branch line being formed by the rails 11, 1 and 12, 3 at the forward part of the points.

Details of the crossings C in FIG. 1 a are given in FIG. 1 b. In FIG. 1 b, 13, 13' are wing rails. The wing rail 13 runs parallel to the branch line 9 with a specified gap between them at the right tip in FIG. 1 a of the fixed portion 7 of the main line rail 2 while the wing rail 13' runs parallel to the main line rails 11' with a specified gap between them at the right tip in FIG. 1 b of the branch line rail 9. The crossings have no movable portion and they are fixed. When the route to the main line is formed at the points, the wheels on one side of a vehicle which has cleared the points move along the fixed rails 7 and the main line 11'. When the route to the branch line is formed, the wheels on the side of the vehicle move along the fixed rails 9 and the branch line rails 9'.

Figure 2A:
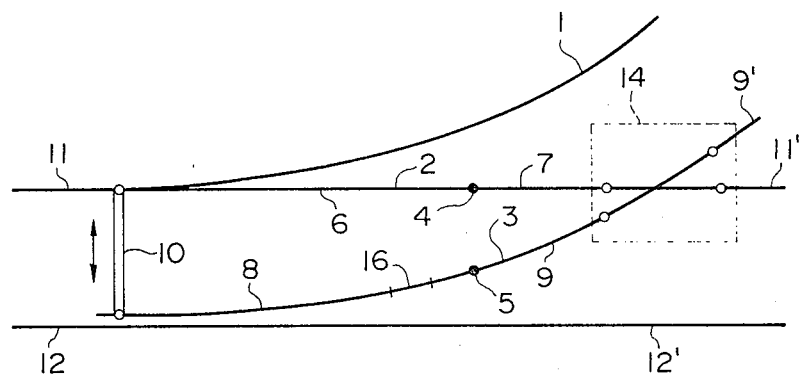
FIG. 2 a is a plan view of another turnout of prior art.
Figure 2B:
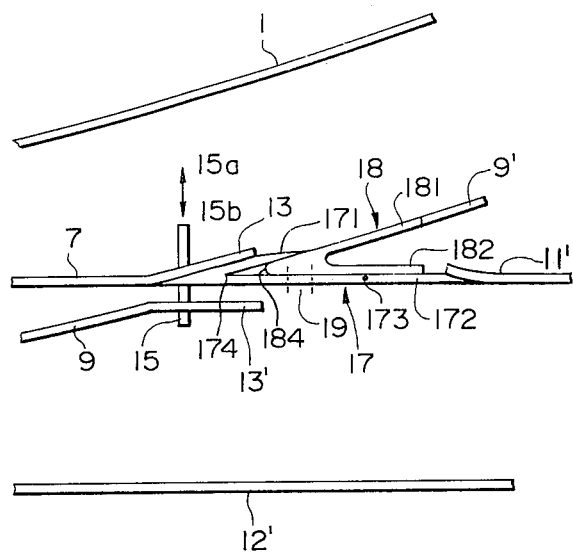
Figure 2C:
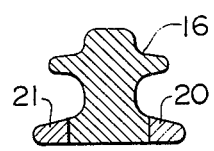

FIGS. 2 a and b illustrate a turnout device which has been developed following the one shown in FIG. 1 a b. With respect to the points, this turnout device is not different from the others in structure and function except that a flexible portion 16 is provided at a specified position on the movable rail 8 of the branch line rail 3. As indicated in FIG. 2 c, said flexible portion is made by matching both lower sides 20, 21 of the corresponding part of the rail. In this arrangement when the movable portion 8 of the branch line rail 3 is swung around the fulcrum 5 by right or left displacement of the linkage 10 relative to the track, presence of said flexible portion 16 ensures a flexible movement. Thus as compared with one illustrated in FIGS. 1 a and b, this one permits realization of long points. FIG. 2 b gives details of the structure of the crossings 14 in the turnout device illustrated in FIG. 2 a. In FIG. 2 b, 18 is the crossings with the integral tips of the turnouts 181 and 182. 17 is a movable rail with integral tips of turnouts 171 and 172. The corresponding inside surface of turnout 172 in the movable rail 17 adjoins the outside surface of turnout 182 in the crossings 18, while the corresponding inside surface of turnout 171 in the movable rail 17 adjoins the outside surface of turnout 181 in the crossings 18. The forward end 184 of the crossings 18 is separated by a certain gap from the inside point 174 where the turnout of the movable rail joins. At a specified spot on the turnout 172 there is a flexible portion 19 of the same construction as the one shown in FIG. 2 c. At the tip of the movable rail 17 an actuating member 15 is provided which swings the movable rail 17 in the direction 15a –15b around the fulcrum 173. Here, 7, 9, 13, 13', 9', 11' represents the same as in FIG. 2 a. In the state of FIG. 2 b, the route to the main line is formed by the fixed portion 7 of the movable rail 2, the movable rail 17, and the main line rail 11' and 12, 12'. When in this state the actuating member 15 is displaced by specified amount in the direction 15b, the tip of the movable rail 17 is swung in the direction 15b around the fulcrum 173. With the aid of the flexible portion 19, the corresponding side of the tip of the movable rail 17 moves out of contact with the wing rail 13 and the wing rail 13' comes into contact with the opposite side of said tip and is locked in that position. Thus the route to the branch line is formed by the branch line rail 9, the turnout 171 of the movable rail 17, the turnout 181 of the crossings 18, the branch line rail 9', and the branch line rail 1.

Next, when the tip of the movable rail 17 is swung in the direction 15a, the state of FIG. 2 b results, thereby forming the route to the main line.

In the device illustrated in FIG. 1 a an inconvenience arises from presence of a gap indicated in FIG. 1 b, which is unavoidable in that structure, the gap occurs between the main line rails 7 and 11' when the route to the main line is formed; and a gap occurs between the branch line rail 9 and 9' when the route to the branch line is formed. Thus a vehicle passing over said gap is jolted considerably, which is one of the reasons for reducing the crossings-passing speed of the vehicle.

By contrast in the crossings of the turnout device illustrated in FIG. 2 a, when the route to the main line is formed, as indicated the outside of the turnout 171 of the movable rail 17 closely fits the inside of the wing rail 13 integral with the tip of the main line rail 7; and when the route to the branch line is formed, the inside of the wing 13' is integral with the tip of turnout 172 of the movable rail 17.

Thus whichever line of the route is formed, no gap occurs in the crossings.

The turnout device illustrated in FIG. 2 a with nogap structure of crossings is superior to the one illustrated in FIG. 1 a in that the former is free from the inconvenience arising from presence of a gap in the crossings.

But so long as the turnout device retains the structures in the prior art as illustrated in FIG. 1 a – 2 c, it would be impossible for the vehicle to run over the turnout at a high speed of over 160 Km/h. At least the following three conditions would have to be satisfied for vehicle to be able to pass the turnout at a speed exceeding 160 Km/h:

1. The structure is such as to permit canting of the turnout curve. This point is to be briefly explained referring to FIG. 3.

Figure 3:
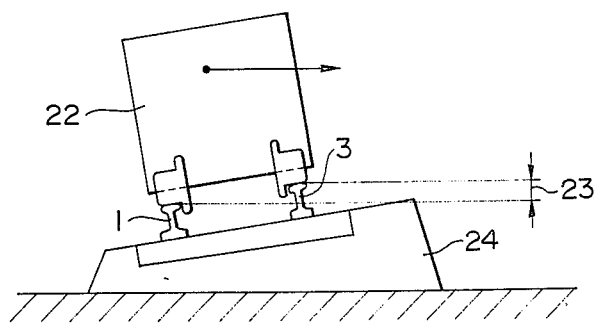
FIG. 3 is an end view illustrating the performance of the vehicle running over a curve.

The turnout curve over which a vehicle passes may be regarded as a part of the circumference of a circle with a specified point as the center. The vehicle 22 passing over this curve is subjected to a centrifugal force which tends to throw the vehicle outward as viewed from said center. On curves with the same radius of curvature, the higher the running speed of the vehicle, the greater will be said centrifugal force acting on it. To counteract such a centrifugal force, the outer rail 3 has to be laid higher than the inner rail 1 by a required amount as illustrated in FIG. 3. In FIG. 3, 24 is a roadbed. The level difference 23 between the outer rail 3 and the inner rail 1 is commonly called a cant. The cant which minimizes the effect of the centrifugal force acting on the vehicle passing over a curve can be expressed by $$\text{Cant } C = 8.4 \frac{V^2}{R}$$

where R is the radius of curvature (m) and V is the curve-passing speed of vehicle (Km/h).

Therefore, to enable high speed passage of vehicle over the turnout, the branch line rail 3, for instance as shown in FIG. 1 a and 2 a, should be laid higher than the branch line rail 1. In FIG. 1 a – 2 c, the main line rails 11, 2, 11' and 12' are straight and are laid on the same level. The inner rail 1 of the branch line is also laid on the same level as the above-mentioned main line rail for connection with said main line rail. If under this condition the required cant is to be given to the branch rail 3, said branch line rail 3 has to be laid higher by the required amount than the other three rails. Suppose that the turnout-passing speed is 160 Km/h and the radius of curvature of the branch line is 6700m. then the cant have to be 25 mm at least. Laying of the branch rail 3 at such a higher level than the other rails is impossible in the structure of the turnout of the prior art.

2. The branch line rail connects via an easement curve to the straight main rail.

Figure 4:
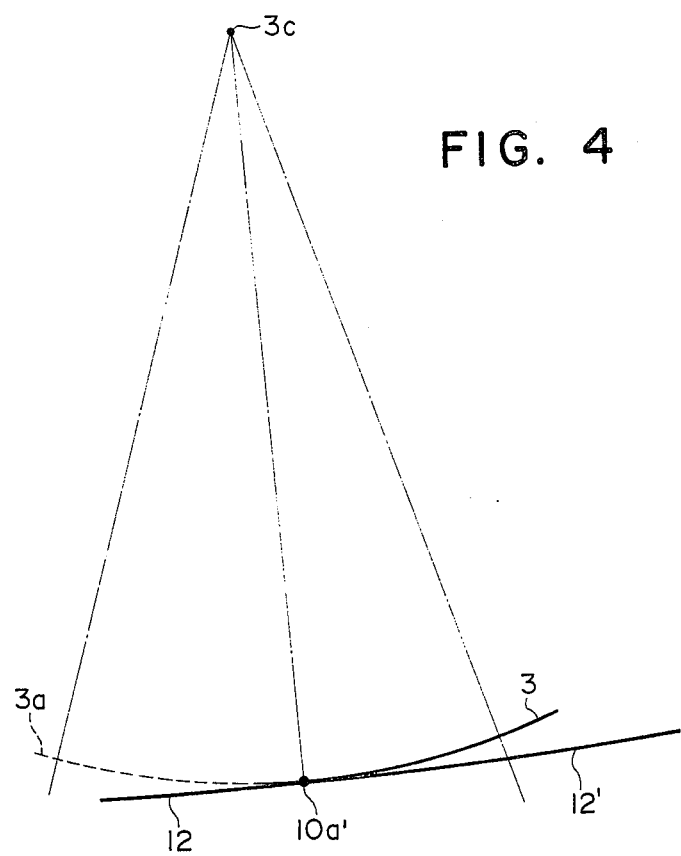
FIG. 4 is a diagram illustrating the relation between the main line track and the branch line track at the points.

In the turnout device in the prior art as illustrated in FIG. 1 a – 2 c, the relation between the branch line rail 3 and the main line rail 12 is set as shown in FIG. 4. When the curve of the branch line rail 3 makes a part of the circumferences 3a of a circle with 3c as the center, the main line rail 12 makes a tangent of said circle with the fixed point at 10a'. In this condition difficulty arises when a vehicle running at a higher speed of, say, over 160 Km/h is about to move from the main line rail 12 onto the branch line rail 3.

Now to simplify the explanation, a vehicle with the body mounted on a four-wheel truck is considered. It is known that when this vehicle is about to move onto the branch line rail 3 at a high speed, the right wheel leading in the travel direction tends to float above the rail. In other words, if the transfer of the vehicle onto the branch line rail 3 does not take place with smoothness at high speeds there is even a harzard of derailment. To avoid this, it is necessary to insert a rail for easement of curve in the branch line rail 3. Insertion of such a rail is practically impossible in the structure of turnout devices in the prior art as illustrated in FIGS. 1 a – 2 c.

3. The crossings of the branch line are designed with no gap.

In the turnout device illustrated in FIGS. 2 a – c, non-gap structure of the crossings is realized. However, it is obvious from the above explanation that such a structure alone cannot permit high speed passage of vehicles over the turnout.

Now referring to FIGS. 5 a and 11 d, a detailed account of the present invention is to be given.

FIGS. 5 a and 5 b are respectively a plan view and a longitudinal section view schematically showing the present invention.

In FIG. 5 a, 25, 25' are forward rails fastened on the cross ties laid on the concrete slab 43' in the forward direction of the points; 32, 32', 33, 33' are rails laid on the concrete slab 43' between the points 27 and the crossings 35: 32, 32' being a pair of rails to form the route to the branch line and 33, 33' being a pair of rails to form the route to the main line; 41, 41', 42, 42' are rails laid on the concrete slab 43' in the right direction in FIG. 5 a, 41, 41' being a pair of rails to form the route to the branch line and 42, 42' being a pair of rails to form the route to the main line.

At the points a girder 27 movable right or left with respect to the longitudinal direction of track is installed. On said girder 27 are laid rails 28, 28' to form the route to the branch line and 29, 29' to form a part of the route to the main line. Details of the movable girder 27 in FIG. 5 a are given in FIG. 5 b and FIG. 7.

Figure 7:
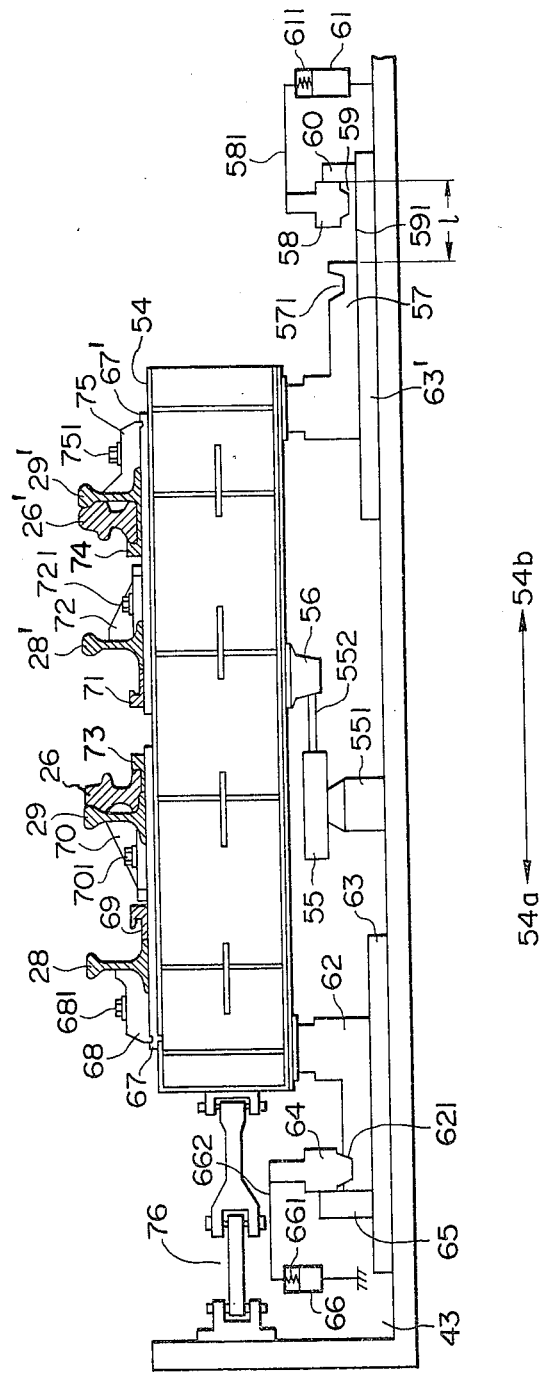
FIG. 7 is a front elevation view of the movable girder of the present invention.

In FIG. 7, 43 is a pit created at the points; and on both sides of the bottom of said pit 43 in the longitudinal direction of the rails there are installed bed plates 63, 63' on which slidable plates 57 and 62 can slide right or left with respect to the longitudinal direction of the rails.

The tops of said slidable plates 57 and 62 are fixed to the corresponding bottom faces of the frame 54 which forms the body of said movable girder 27. On the right top of said slidable unit 57 a recess 571 is provided which can be engaged by a boss 59 provided at the bottom of the movable stopper 58 connected to a push means 61 via linkage 581. On the left top of said slidable unit 62 a recess 621 is also provided which can be engaged by a boss provided at the bottom of the movable stopper 64 connected to a push means 66 via linkage 662. The numeral 55 denotes a push means like a cylinder of the prior art, said push means being mounted on a stand 551 installed at the specified part of the bottom of the pit 43. The tip of the piston rod 552 of said cylinder 55 is fastened to a fixture 56 provided at a specified part of the bottom of the frame 54.

In FIG. 7, said recess 571 of the slidable unit 57 is positioned to the left from the movable stopper 58, said movable stopper 58 being pressed down by the force of the cylinder spring 611 with its right side contacting the left side of the fixed stopper 60. The recess 621 of the slidable unit 62 is engaged by the boss of the movable stopper 64, the left side of the stopper 64 and the left side of the slidable unit 62 contacting the corresponding right side of the fixed stopper 65.

If in this state, the cylinder 55 is operated following the cylinders 61 and 66, the movable stoppers 58 and 64 are moved upward against the force of the cylinder springs 611 and 661, thereby movable stopper 64 is disengaged from the recess 621. Thereafter the cylinder rod 552 is pushed forward in the direction 54b by the drive of the cylinder 55, thereby displacing the frame 54 in the direction 54b. The displacement of said frame 54 in the direction 54b is accompanied by the displacements of the slidable unit 57 and 62 also in the direction 54b. It is possible by appropriate setting of the drive time of the cylinder 55 to bring the recess 571 of the slidable unit 57 into position just under the boss 59 of the movable stopper 58 of the push means 61, when the right side of the slidable unit 57 contacts the left side of the fixed stopper 60. Thereupon, by discharging of the cylinder 61, said stopper 58 is displaced downward, thereby making the boss at the bottom of the movable stopper 58 engage the recess 571 of the slidable unit 57. Meanwhile, by displacement of the slidable unit 62 in the direction 54b, the left side of the slidable unit 62 moves out of contact with the right side of the fixed stopper 65 and when the movement of the rod 552 in the direction of 54b is stopped, there is a specified gap between the right side of the fixed stopper 65 and the left side of the slidable unit 62. By discharging the cylinder 66, the movable stopper 64 is displaced downward to be set in said gap. Thus the frame 54 is displaced by the specified distance *l* in the direction 54b.

To bring the frame 54 thus displaced to the position as shown in FIG. 7, the same process as above is used. Namely, movable stoppers 58 and 64 are displaced upward by the charge of the cylinders 61 and 66, the cylinder 55 is worked to withdraw the cylinder rod 552 by a specified amount in the direction 54a and then it is stopped and cylinders 61 and 66 are discharged. Thus the frame 54 comes back to the position as illustrated in FIG. 7.

The numerals 76, 76' (not shown) denotes the link mechanisms, one end of these mechanisms being fastened to one end of the frame 54 in the moving direction and the other ends of them being fastened to the opposite pit walls with a specified gap provided respectively, thereby smooth movement of said frame 54 in a direction perpendicular to the longitudinal direction of track is guaranteed.

In the present embodiment the frame 54 which forms the body of the movable girder 27 is composed of three continuous spans of I-beams in the prior art; it is a structure comprising a longitudinal member parallel to the rail and a transverse member located below the rail fastenings.

On top of said frame 54 is laid a bed plate 67 and 67' upon which are laid the rails 28, 29, and the rails 28', 29'. In FIG. 7 at a specified interval in the longitudinal direction of rail the rail 28 is fastened by the bolt 681, with a known rail brace 68 inserted in between. On one side of the rail a flanged guide rail 69 serves to guide the displacement of the movable rail to be described later.

The rail 28' is fastened using the rail brace 72 and the bolt 721; and the rails 29, 29' are fastened respectively using the rail brace 70, the bolt 701 and the rail brace 75, the bolt 751 in the same way as the rail 28. To the left of the rail 28' a flanged guide 71 is installed; to the right of the rail 29 a flanged guide 73 is installed; and to the left of the rail 29' a flanged guide 74 is installed. The bottom of the above-mentioned flanged guides are welded on the corresponding top of bed plate 67 and 67' and are designed to guide the displacement of the movable rail to be described later; opposite faces of the rails and flanged guides are intergrated.

In FIG. 5 *a*, the faces of the rails 25, 25' laid to the left of the girder 27 are separated by a specified gap from the opposed end faces of the opposed rails 28–29' laid on the girder 27, and the other end faces of the rail 28, 29' and corresponding end faces of rails 32 – 33' are separated by a specified gap.

Similarly, end faces of the rails 36, 36', 38, 38' laid on the girders 35 and the opposed end faces of rails 32 – 33' as well as the other end faces of the rails 36, 36', 38, 38' and the corresponding end faces of the opposed rails 41, 41', 42, 42' are separated by a specified gap. The ends of these rails, namely, the right end of the rails 25, 25', both ends of the rails 28 – 29' on the girder 27, both ends of rails 32 – 33', both ends of the rails 36, 36', 38, 38' on the girder 35, and the left ends of the rails 41, 41', 42, 42' are respectively designed to diverge outward at a specified angle from the longitudinal axis of the track. Namely the outward divergence occurs at the ends of the following pairs; 251, 251'; 281, 281'; 282, 282'; 291, 291'; 292, 292'; 321, 321'; 322, 322'; 331, 331'; 332, 332'; 361, 361'; 381, 381'; 362, 362'; 382, 382' ; 421, 421'; and 411, 411'. Such an arrangement is adopted so that movable rails can be moved along the inside surface of the outward-diverging parts of said rails and thereby the opposed rails are connected through said movable rails, thus forming a desired route.

The movable rail 26 as viewed from above looks substantially like a trapezoid, but its two sides have a specified curvature. For instance, when in FIG. 8 *a* a circle with radius R with center C is drawn, said two sides 261, 262 form parts of the circumference of said circle. The inner sides 252, 282 of the outwarddiverging portions 251, 281 of the rails 25, 28 also constitutes part of the circumference of said circle.

Figure 8A:
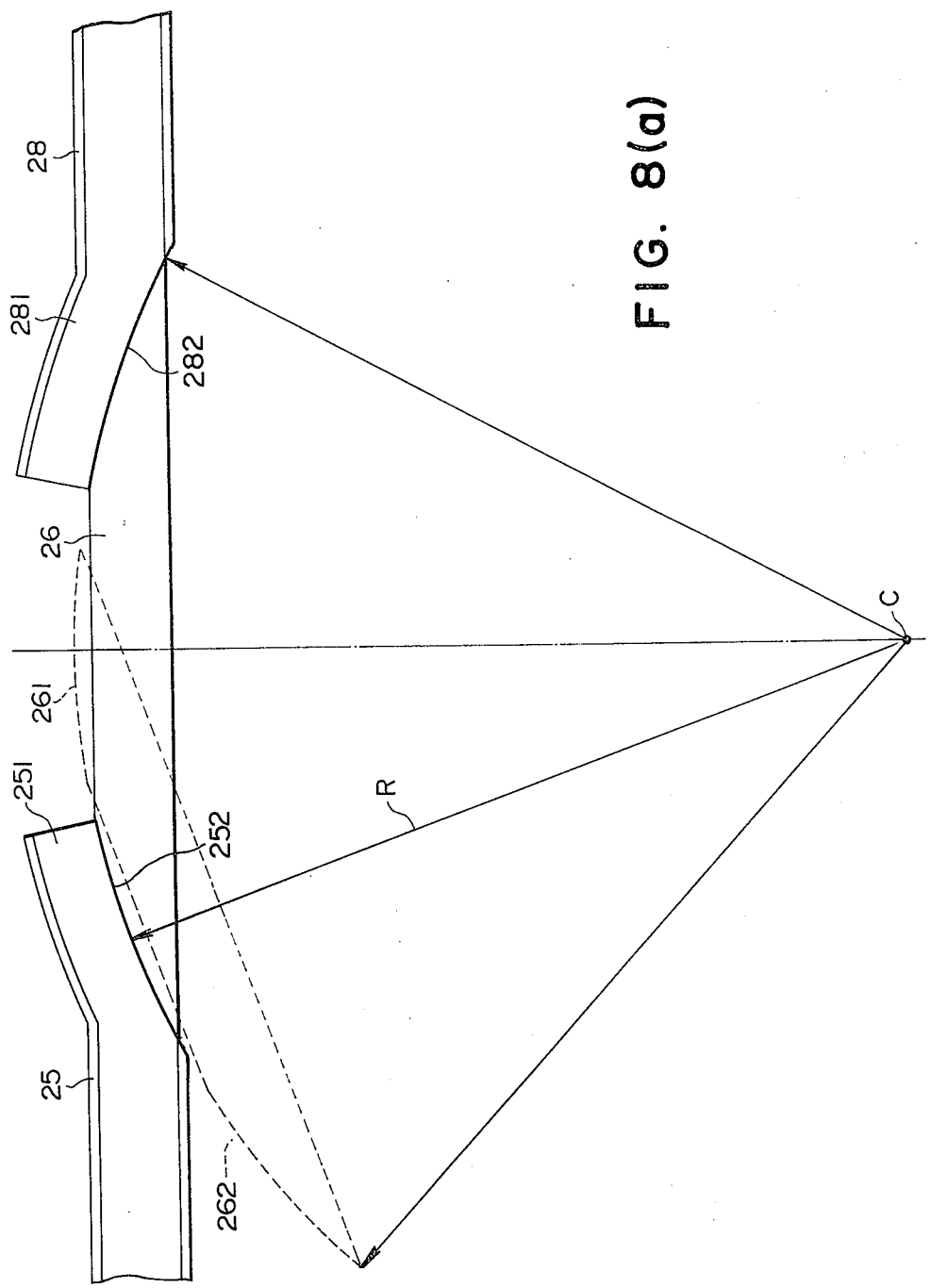
FIG. 8 a is a plan view illustrating the movement of the movable rail of the present invention.

Under this arrangement, the movable rail 26 can be displaced along the circumference of radius R with center C by a drive means and thereby the movable rail can be transferred from the solid line position in FIG. 8 *a* to the dotted line position or from the dotted line position to the solid line position, thus enabling easy, safe connection and disconnection of the rails 25, 28. FIG. 8 *b* is a plan view showing the details of the movable rail. FIGS. 8 c – e respectively show the sections along 8c — 8c line, 8d — 8d line and 8e — 8e line of FIG. 8 b. In FIGS. 8 c, 8 d, the rail 25 represented by a dotted line is shown to illustrate the positional relation between the movable rail 26 and the rail 25 when, as stated later, the movable rail 26 is set at a normal connecting position of rail 25 and 28.

Referring to FIG. 6 a, – 11 d, a specific arrangement is described for setting the main line route or the branch line route by connection or disconnection, using a movable rail, of the rail on the girder 27 and the rails laid on the adjoining longitudinal track and of the rail laid on the girder 35 and the rails laid on the adjoining longitudinal track.

Figure 9A:
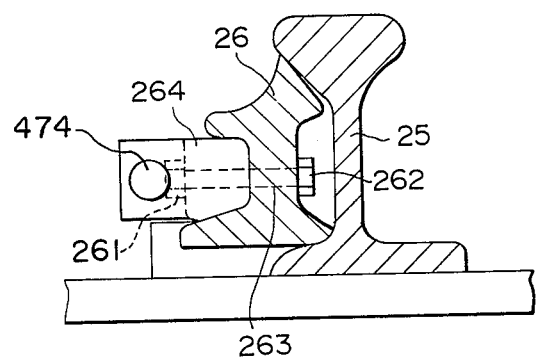
FIG. 9 a is a sectional view illustrating the movable rail to which a movement mechanism is fitted.
Figure 9B:
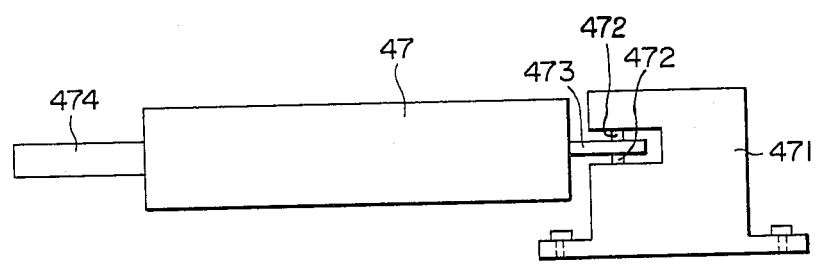
Figure 10A:
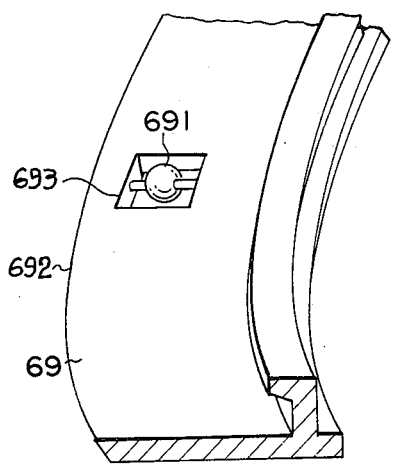
FIG. 10 a is a partially perspective view illustrating the set position detector of a movable rail.
Figure 10B:
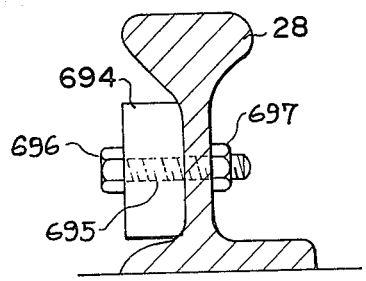
Figure 11A:
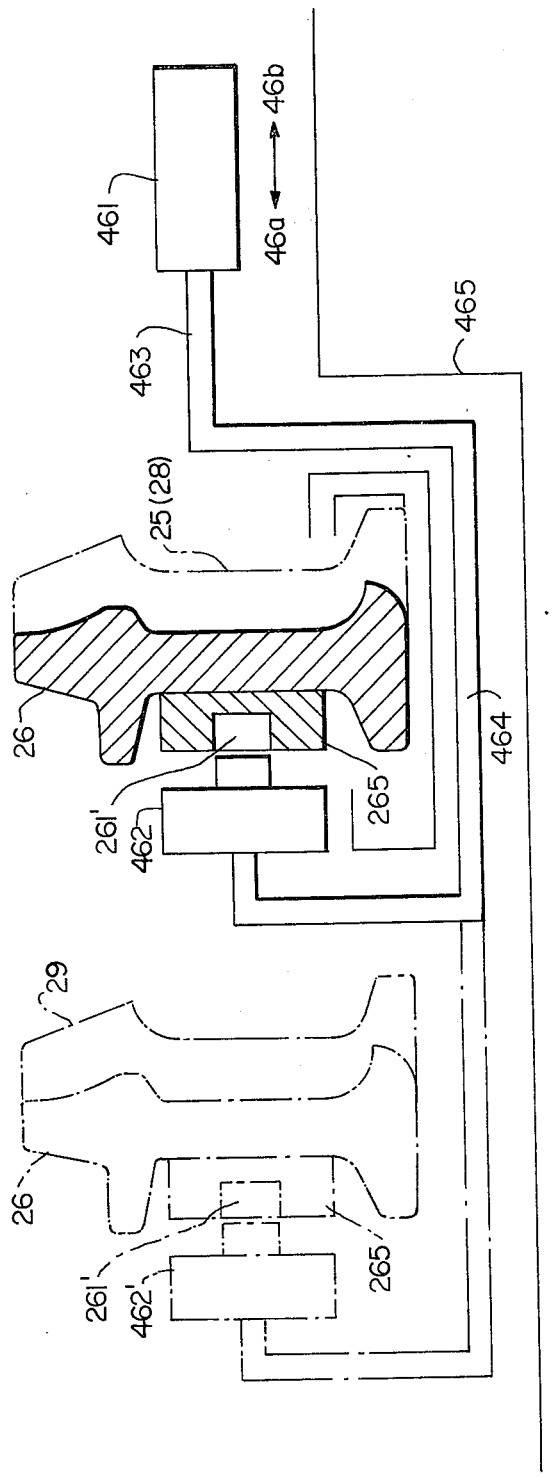
FIG. 11 a is a partial section view of a close-fit device of the present invention.
Figure 11B:
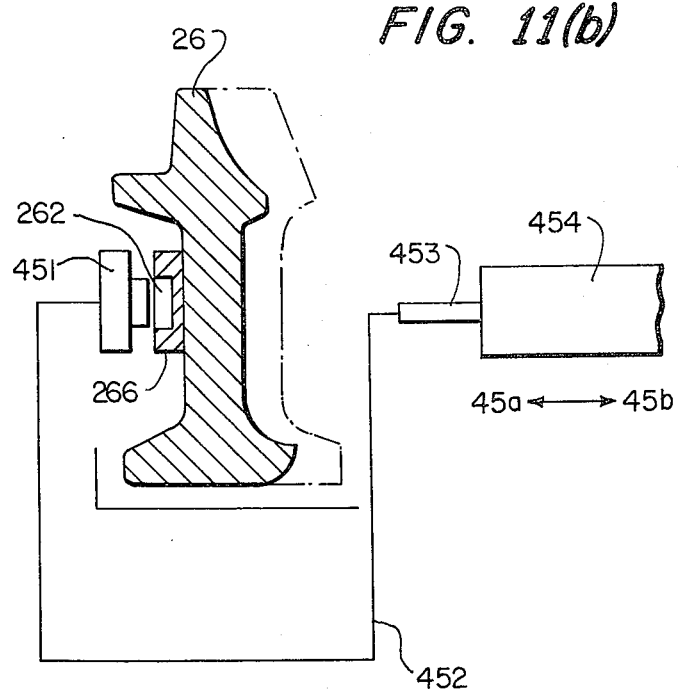
Figure 11D:
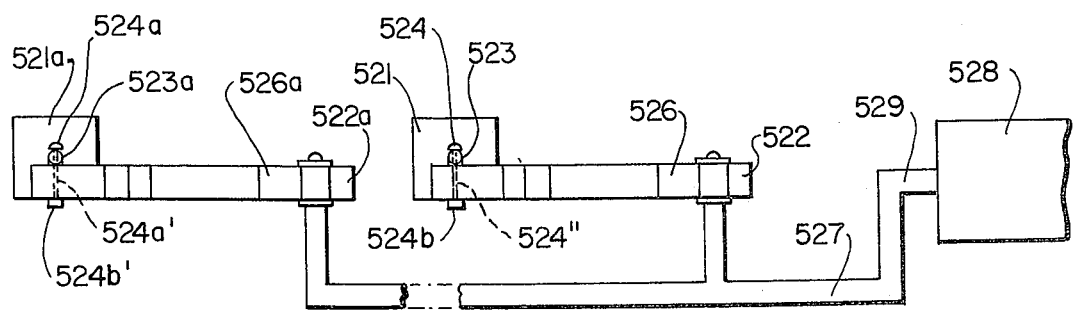
Figure 11C:
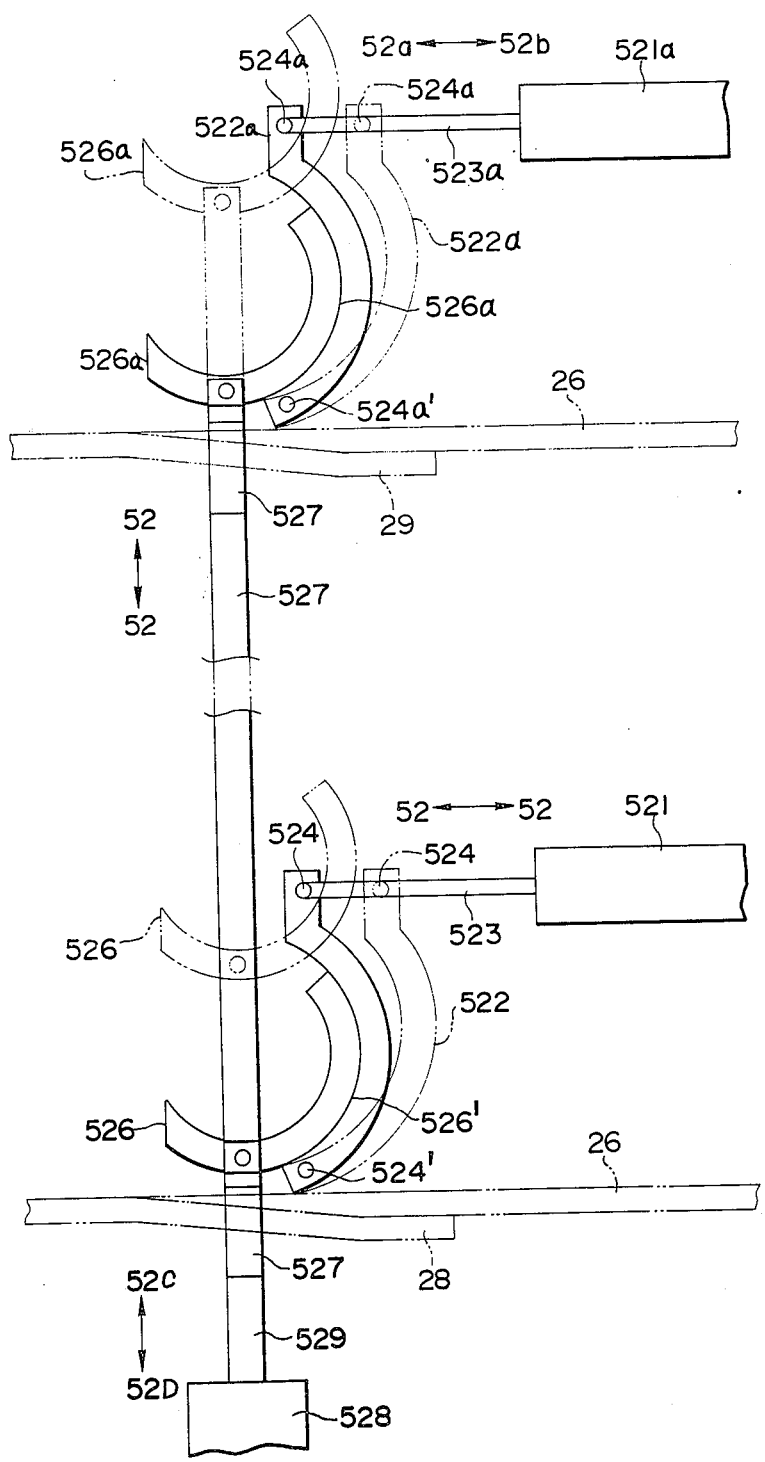

In FIG. 6 a, the dotted line area represents the part of track laid on the girder 27 and the same symbols indicate the same elements as in FIG. 5 a. The end of the rail 25 toward the girder 27 can connect with the end of the rail 28 toward the rail 25 via the movable rail 26. The numeral 47 denotes a drive means such as a hydraulic cylinder. The tip of the rod in the cylinder 47 is fixed to a specified part of the inner side of the movable rail 26, for instance, as shown in FIG. 9 a. In FIG. 9 a, on the inner side face of the end part of the movable rail 26 is fixed fixing member 264 by means of the bolt 263 and nuts 261, 262, and the tip of the rod 474 of the cylinder 47 is fixed to the corresponding face in the longitudinal direction of the rail of said fixing member. As shown in FIG. 9 b on the end face of the cylinder 47 is provided a projection 473 and the projection 473 is connected through pin 472 to the fixing member 471. Thus the cylinder 47 can move left or right to the longitudinal direction of rail with the pin 472 as a center, as well as along the longitudinal direction of track. Thus when the cylinder 47 is driven and its rod 474 moves, the movable rails 26 moves in the direction as shown by the arrow in FIG. 8 f along the curved flanged guide rails 69. The numeral 48 denotes a detector of the set position of the movable rail 26 and it is constructed as shown in FIG. 10 a. In FIG. 10 a, a specified part of the tread 692 of the flanged guide rail 69 for the movable rail 26 is notched to create a recess 693 and said recess 693 is lined with an electrical insulator. A steel ball 691 is housed in said recess 693 thus formed. Said steel ball 691 has a diameter such that its top is slightly above the tread of the flanged guide rail 69 when said ball is housed in said recess 693. When the movable rail 26 is out of contact with rail 28, the rod 474 of the cylinder 47 is withdrawn in the direction f, in FIG. 6 a, the movable rail 26 is moved in the direction f along the guide rail 69. In the course of this movement, the tip bottom of the guide rail 69 hits the steel ball 691, whereby the set position detector 48, the steel ball 691 and the moveable rail 26 form an electic circuit, by which said set position detector 48 shows that the movable rail 26 has gone to the position of the steel ball 691. The reset position detector 49 has the same structure as the set position one. The forwarding of the movable rail to the position of the steel ball is known from the set position detector, while the withdrawal of the movable rail to the position of the steel ball is known from the reset position detector. Meanwhile, the movable rail 26 is set in position to connect with the rails on both sides of it in the following way.

Now suppose the right end of the movable rail 26 is separated by a specified gap from the left end of the rail 28 when the drive cylinder 47 is driven to move said movable rail 26 in the direction f, the set position detector 48 detects this movement, which ceases when the tip of the said movable rail 26 hits the stopper 694 which is fitted to a specified part of the inside face of the rail 28 via bolt 659 and nuts 696, 697 as shown in FIG. 10 b. Thus, the movable rail 26 is set in position between the rail 28 and 25. Thereby the drive timing of said drive cylinder is so selected that its drive may be stopped just when said movable rail 26 comes into set position. The specified part of the inside face of the rail 25 is fitted with a stopper with the same as the stopper 694 thereby the movable rail 26 can be set in the withdrawal position just in the same way as above. The numeral 46 indicates a close-fit device which tightly holds together end of the movable rail 26 and the end of the rail 25, in the state of the movable rail set in a normal connecting position of, say, the rails 25 and 28.

Details of the close-fit device 46 are given in FIG. 11 a. In FIG. 11 a, at a specified position on the inside web of the end of the movable rail 26 a projection with a notch 261 is fitted via bolt and nuts, say, just the same way as in FIG. 10 b. Meanwhile, a close-fit heat 462 is provided so that it may come opposite to said notch 261 when the movable rail 26 reaches the set position. Said close-fit head is so shaped as to snugly fit said notch 261' and is fastened to the rod 463 of the hydraulic means 461 like a cylinder via a U-type linkage 464. In the present embodiment the linkage 464 is fastened to the rod 463 through a pit 465 created in the concrete slab beneath the movable rail 26 and the rail 25 so as to be movable at a specified distance in the direction of 46a–46b. Therefore, while the movable rail 26 is in movement, the rod 463 is pushed in the direction 46a, thereby maintaining a clearance between the end face of the close-fit head 462 and the web surface of the movable rail 26. When, however, the movable rail 26 attains the set position, the cylinder rod 463 is moved in the direction of 46b, thereby causing the head 462 of the close-fit piece to fit the notch 261' in the movable rail 26. Thus, the movable rail 26 can closely fit the rail 25 running alongside. The numeral 45 indicates a locking device. In the present embodiment, said locking device 45 is located farther in the direction of the rail 25 than the close-fit device 46. Said locking device 45 is intended to lock the close-fit condition of the two rails after the movable rail 26 and the rail 28 have been brought by the closefit device 46 into tight contact at the specified ends. In the present embodiment the locking device 45 is of the same structure as the close-fit device. The locking device 45 is briefly to be explained referring to FIG. 11 b. At the specified part of the end web of the movable rail 26 a projection 266 with a notched recess 262 is provided in addition to the projection 265 in FIG. 11 a. On the inner side of the movable rail 26 is provided a locking recess 451 which has at its tip a boss engageable with said notched recess. Said locking piece 451 is fitted to one end of the U-type linkage 452 which leads to the outer sides of said rails through the concrete slab beneath the movable rail 26 and the rail 25. At the other end of said U-type linkage is fixed the tip of the rod 453 of the cylinder 454.

In the state of the movable rail 26 being locked in the set position, the boss of the close-fit piece 451 may come opposite to the notched recess 262 of the movable rail 26, the tip boss of the locking piece 451 can engage the notched recess 262' or disengage from it by movement in the direction 45a ↔ 45b of the rod 453 driven by the cylinder 454. Through the above engagement the movable rail 26 and the rail 25 are locked together by the locking device and through above disengagement the two rails 26 and 25 are unlocked. The mechanism of the above mentioned close-fit and locking device are simple and the movable rail 26 and the rail 25 can be locked together efficiently. In FIG. 6 a where the movable rail 26 is in the set position, the left ends of both rails 28 and 29 have to be equipped with two close-fit devices and two locking devices to close-fit and to lock together the rails 28, 29 and the movable rail 26. Therefore, it is difficult from positional standpoint to provide any of these devices of the same structure as the locking device 45. Accordingly it would be desirable to provide at such a position a close-fit device 50 and a locking device 52 of the following construction. As for the close-fit devices 50, as shown by dotted line in FIG. 11 a the close-fit head 462' of the same construction as close-fit head 462 is provided inside of rail 29 so that said head 462' is able to come opposite to the notch 261 of the projection 265 of the movable rail 26 when the main line route is formed as described later, and said close-fit head is fastened to the linkage 464. Thus, by the movement of the rod 463 in the direction of 46a ↔ 46b the movable rail 26 can closely fit the rail 29 when the main line route formed and when branch line route formed the movable 26 can closely fit the rail 28. As for the locking device 52, a cylinder 521, 521a is provided in the longitudinal direction of rail on the inner side adjoining the rail 28, 29 as shown in 11 c, d. To the rod 523, 523a of said cylinders 521, 521a are fitted by a bolt 524, 524a and nuts 524, 524b, 524a, 524c' stoppers 522, 522a which have a ⊃-shape respectively. The other end of said stoppers 522 and 522a are fixed by a fixing pins 524', and 524b. Therefore, when the rods 523, 523a are withdrawn in the direction 52b, the stopper 522, 522a assume the position indicated by a dotted line; and when said rod 523, 523a is pushed in the direction 52a, said stoppers 522, 522a assume the position indicated by a solid line. Meanwhile locking heads 526, 526a have a ⊃-shaped, the outside curve of the locking heads 526, 526a in FIG. 11 c being able to fit the corresponding inside curve of the stopper 522, 522a. Said locking head 526 is fixed to one end of the linkage 527 which leads to the outer side of the rail 28 through the pit 43 beneath the rail 28, and fixed to the rod 529 of the cylinder 528. Further, other end of the linkage 527 extends to the inner side of the rail 29 through the pit 43 beneath the rail 29 and the locking head 526a is fixed to the tip of said linkage 527. The linkage 527 and 523 are disposed at right angles to each other. Withdrawal of rods 523, 523a of the cylinder 521, 521a in the direction 52b brings the stopper 522, 522a to the dotted line position. When in this state the cylinder 528 is driven to withdraw the rod 529 and the locking head 526, 526a comes close to the solid line position, and the cylinder rods 523, 523a are pushed in the direction 52a. Then, as the stopper 522, 522a reached the solid line position, the outside of the right curve of locking head 526, 526a touches the inside of the corresponding curve of the stopper 522, 522a. Thus, when the branch line if formed the locking head 526 engages the stopper 522 which is pushed in the direction 52d by the rod 529 of the cylinder 528 thereby pressing the movable rail 26 in the direction of rail 28, thus locking both the rails 26 and 28. When the main line route is formed the locking head 526a engaged with the stopper 522a is pushed in the direction 52d by the rod 529 of the cylinder 528, thereby pressing the movable rail 26 in the direction of rail 29 thus locking both the rails 26 and 29.

The above is a description of the mechanism for connecting or disconnecting the rails 25 and 28 by means of the movable rail 26. As described later the mechanism for connecting or disconnecting rails 25, 29 through movable rail 26; rail 25', 28' through movable rail 26'; rail 25', 29' through movable rail 26'; rail 28, 32 through movable rail 30; rail 29, 33 through movable rail 31; rails 28', 32' through movable rail 30'; rails 29', 33' through movable rail 31'; rail 32, 36 through movable rail 34; rails 32', 36' through movable rail 34'; rail 33, 38 through movable rail 37; rail 33', 38' through movable rail 37'; rails 36, 41 through movable rail 39; rails 36', 41' through movable rail 39'; rails 38, 42 through movable rail 40; and rail 38', 42' through movable rail 40'; are entirely the same as the above-mentioned mechanism for connecting or disconnecting the rails 25, 28 through the movable rail 26. Namely in structure the locking devices 45' 45a, 45b, 45 c, 45d, 45e, 45f, 45g, 45h, 45i, 45j, 45k, 45l, are the same as the locking device 45; locking device 53; 52a, 53a; 52b, 53b; 52c, 53c are the same as the locking device 52, the close-fit devices 46', 46a, 46b, 46c, 46d, 46e, 46f, 46g, 46h, 46i, 46j, 46k, 46l, are the same as the close-fit device 46; close-fit device 51, 50a, 51a, 50b, 51b, 50c, 51c are the same as the close-fit device 50, the drive cylinders 47', 47a, 47a' 47b, 47b', 47c, 47c' 47d, 47d', 47d'', 47d''', 47e, 47e' are the same as the drive cylinder 47; the set position detectors 48', 48a, 48a', 48f, 48f', 48b, 48b' 48c, 48c', 48d, 48d', 48e, 48e' are the same as the set position detector 48; the reset position detectors 49', 49a, 49a', 49f, 49f' 49b, 49b', 49c, 49c', 49d, 49d', 49e, 49e' are the same as the reset position detector 49; and the movable rails 26', 30, 30', 31, 31', 34, 34', 37, 37', 39, 39', 40, 40' are the same as the movable rail 26. Concurrently, the constitution of the movable girder 35 is absolutely the same as that of the movable girder 27 as illustrated in FIG. 7.

Under such arrangement, FIG. 5 a and 6 b illustrates state of the branch line having been formed.

Namely, the rail 25 is connected to the movable rail 26, the rail 28, the movable rail 30, the rail 32, the movable rail 34, the rail 36, the movable rail 39 and the rail 41 to form one rail of the branch line, while the rail 25' is connected to the movable rail 26', the rail 28', the movable rail 30', the rail 32', the movable rail 34', the rail 36', the movable rail 39' and the rail 41' to form the other rail of the branch line, thereby completing the branch line track.

From this state the main line route can be formed by the process of the present invention as follows.

First after cancelling the close-fitting and locking of the movable rails 26, 26', 30, 30', 34, 34', 39 and 39' by the corresponding close-fit devices 46, 46', 50, 51, 50a, 51a, 50b, 51b 50c, 51c, 46a, 46b, 46e, 46f, 46i, 50a, 51a, 50b, 51b 50c, 51c, 46a, 46b, 46e, 46f, 46i, 46j, and locking devices 45, 45', 52, 53, 52a, 53a, 52b, 53b, 52c, 53c, 45a, 45b, 45e, 45f, 45i, 45j,. After that, the drive means 47, 47', 47a, 47a', 47c, 47c', 47d'', 47d''' are driven to push or withdraw respective rods, thereby displacing the movable rail 26, 26' in the direction e; 30, 30' in the direction f; 34, 34' in the direction f; and 39, 39' in the direction f. As the result said movable rail 26, 26', 30, 30', 34, 34', 39, 39' are respectively disconnected from the rails 28, 28', 28, 28', 32, 32', 36, 36'. In this state the disconnected end of each movable rail is separated by a specified gap from the opposed end of the rail from which said movable rail has been disconnected; these disconnected ends of rails leave at least by the specified distance to the opposite direction respectively from the girders 27, 35, thereby permitting lateral displacement of these girders relative to the rails. Next the cylinder 55 in FIG. 7 and another cylinder of the same structure of displacing the girder 35 are driven by the process as described referring to FIG. 7, thus displacing the girders 27 and 35 by the specified distance respectively in the directions 27a and 35a in FIG. 6 a, b to a first position and then these cylinders are stopped. In this state the ends of the rails 25, 25' are opposed to the ends of the rails 29, 29' laid on the girder 27, which form a part of the main line. The left ends in FIGS. 5 a and 6 a of the rails 33, 33' are opposed to the right ends of said main line rails 29, 29'; the left ends of the rails 38, 38' laid on the girder 35, which form a part of the main line are opposed to the ends of the rails 33, 33'; and the right ends of the rails 38, 38' are opposed to the left ends of the rails 42, 42' so that these rails may be respectively connected with the corresponding rails through movable rails.

Thereafter the drive means 47, 47', 47b, 47b', 47d, 47d', 47e, 47e' in FIG. 6 a and b are driven to displace by the specified amount the movable rails 26, 26' in the direction f; 31, 31' in the direction e; movable rails 37, 37' in the direction e; movable rails 40, 40' in the direction of e, to a third position, said movable rails being then locked in set position by means of the corresponding locking device. Thus, the main line route is formed by the rail 25, the movable rail 26, the rail 29, the movable rail 31, the rail 33, the movable rail 37, the rail 38, the movable rail 40 and the rail 42; and the rail 25' the movable rail 26', the rail 29', the movable rail 31', the-rail 33', the movable rail 37', the rail 38', the movable rail 40' and the rail 42'. The movable rails thus set are, as descibed in FIG. 11 a –c close fitted and locked respectively by the close-fit device 46, 46', 50, 51, 50a, 51a, 50b, 51b, 50c, 51c, 46c, 46d, 46g, 46h, 46k, 46l and the locking devices 45, 45', 52, 53, 52a, 53a, 52b, 53b, 52c, 53c, 45c, 45d, 45g, 45h, 45k, 45l,. The above process is reversed to change the main line route to the branch line route. Namely, after cancelling the close-fitting and locking of the movable rails 26, 26', 31, 31', 37, 37', 40, 40', by the corresponding close-fit devices and the locking devices, the drive means 47, 47', 47b, 47b', 47d, 47d', 47e, 47e' are driven to displace the movable rails 26, 26' in the direction e; 31, 31' in the direction f; 37, 37' in the direction f; and 40, 40' in the direction f, thereby disengaging respective movable rails from the movable girder 27, 35. Next, the cylinder 55 in FIG. 7 and another cylinder on the movable girder 35 of the same structure as said cylinder 55 are driven to displace by the specified distance the girders 27, 35 in the direction 27b, 35b to a second position; and then these cylinders are stopped. Thereafter using the drive means 47, 47', 47a, 47a', 47c, 47c', 47d'', 47''' the movable rails 26, 26' are displaced by the specified amount on the direction f; 30, 30' in the direction e; 34, 34' in the direction e; 39, 39' in the direction e to a fourth position; and these rails are close-fitted an locked respectively by the corresponding close-fit device and the locking devices. Thus, the branch line route in FIG. 5 a and 6 b can be formed.

In the above-mentioned embodiment of the present invention the drive means 47–47e, the hydraulic means 461 for the close-fit devices, the cylinder 454 for the locking device and the cylinder 521, 521a, 528 for the locking devices may be controlled to push or withdraw as mentioned above, by means of the control system of prior art.

In the conventional turnout device, for instance, in FIG. 2 a the left end of the branch line rail 8 and the corresponding end of main line rail 12 as well as left end of the branch line rail 1 and the corresponding end of the main line rail 2 are integrated in close proximity to each other. Thus, it is considered structurally impossible to make the outer rail 3 of the branch line at higher level than the main line rails level 2, 12 to provide an cant to the branch line track.

According to the present invention, however, the main line rails and the branch line rails are respectively laid independently over the entire length of turnout with a specified gap between them. Thus, it becomes possible to provide a cant to the branch line track within the construction gauge of track and thereby to permit passage into the turnout at higher speeds than with a conventional turnout device. Further, the present invention makes it possible to realize a more desirable non-gap structure of turnout device free from guard rail and wing rail of the conventional crossings. Meanwhile, since the branch line rails, 28, 28', 32, 32', 36, 36', 41, 41' are laid independently, it become very easy to give easement curve to, say, the rails. These points are to be described specifically referring to FIG. 5 a.

In FIG. 5 a, line l is drawn relative to the position of the turnout above.

If it is so arranged that the radius of the branch line curvature is 6700m, length of the girder 27 and 35 in the longitudinal direction of rail being 69 m and 28 m respectively, the distance between the girder 27 and 35 being 77 m, the straight line 25 is followed by easement curve A–B of 25 m in length where the cant is stepped up gradually to the maximum level of 25mm, which is followed by simple curve B–C where said maximum level of the cant is maintained, which is again followed by the easement curve C–D where the cant is gradually stepped down to 0, which is finally followed by the straight line D-e, where "A" representing the distance from the end of the girder 27 adjacent to the rails 25, 25', "B" representing a line 25m separated from the above mentioned A; "C" representing the end of the girder 35 adjacent to the rail 32, 32', "D" representing the end of the girder 35 adjacent to rail 41, 41', the turnout-passing speed of vehicle can be about 160km/h. Moreover, according to the present invention, even if the branch line has a large radius or curvature, it is not necessary to be concerned with possible deflection of the tongue rail which has been a problem in a conventional turnout device.

Thus, the present invention realizes a turnout device permitting high speed passage of vehicles over the turnout.

The present invention may be embodied in other specific forms without being departing from the spirit or essential characteristics thereof. The presently disclosed embodiments are therefore to be considered in all respects as illustrative and not restrictive, the scope of the invention being indicated by thee appended claims rather than the foregoing description, all changes which come within the meaning and range of equivalency of the claims are therefore intended to be embraced therein.

We claim:

1. A movable girder type high speed turnout device for switching a track between main line and branch line rails comprising:
   a. girder means which are movable right or left to the longitudinal direction of the rails;
   b. a plurality of rails laid on said girder means forming portions of said main line and branch line; and,
   c. movable rail means for connecting the ends of the rails laid on said girder means with the opposed ends of the main line rails and the branch line rails laid adjoining said girder means, wherein lateral displacement of said girder means to a first position forms a specified gap between the ends of the main line rails on the girders and the corresponding ends of fixed main line rails and lateral displacement to a second position forms a specific gap between the ends of the branch line rails on the girders and the corresponding ends of the fixed branch line rails; and the longitudinal displacement of said movable rail means to a third position closes said specified gaps thereby forming a main line route of the main line rails laid on the girders facing the corresponding ends of the fixed main line rails, and the longitudinal displacement of said movable rails to a fourth position closes said specified gaps thereby forming a branch line route of the branch line laid on the girders facing the corresponding ends of the fixed branch line rails, whereby a main line route or branch line route can be formed.

2. The device of claim 1, wherein the level of the rails on said girder means forming said main line is different from the level of the rails on said girder means forming said branch line whereby a desired cant is given to the branch line rails which form the branch line route.

3. The device of claim 1, including close-fit means and locking means for closely fitting and locking said movable rails to the ends of the main line rails and the branch line rails laid on said girders and the corresponding ends of the fixed main line rails and branch line rails.

4. The device of claim 3, wherein said close fit means compirses:
   a. a notch in said movable rail means;
   b. head means for engaging said notch; and,
   c. drive means for forcing and holding said head means into engagement with said notch, wherein when said head means engages said notch means and said movable rail means is forced into engagement with said rails.

5. The device of claim 3, wherein said locking means comprises:
   a. a first ○ shaped member; and,
   b. a second ○ shaped member said first and second member being positioned such that said first member engages said second means to force said movable rail means into engagement with said rails.

6. The device of claim 1, including an easement curve inserted at a specified portions of the branch line rails.

7. The device of claim 1, wherein the ends of the main line rails and the branch line rails on the girder means and the opposed ends of the correspsonding fixed rails are outward-divergently curved with a predetermined curvature, such that said movable rails are displaceable along said curved ends.

8. The device of claim 1, wherein said girder means comprises:
   a. bed plates at each side of said girder means;
   b. a slidable plate mounted on each of said bed plates;
   c. frame means mounted on said slidable plates, said rails on said girder means being mounted on said frame means; and,
   d. drive means for sliding said frame means and said slidable plates on said bed plates in a direction transverse to the direction of said rails whereby said rails are laterally displaced for the formation of either said main line route or said branch line route.

9. The device of claim 8, further including stopper means for limiting the lateral displacement of said girder means and for holding said slidable plates against said bed plate means thereby preventing undesirable displacement of said slidable plates.

* * * * *